Figure 1:
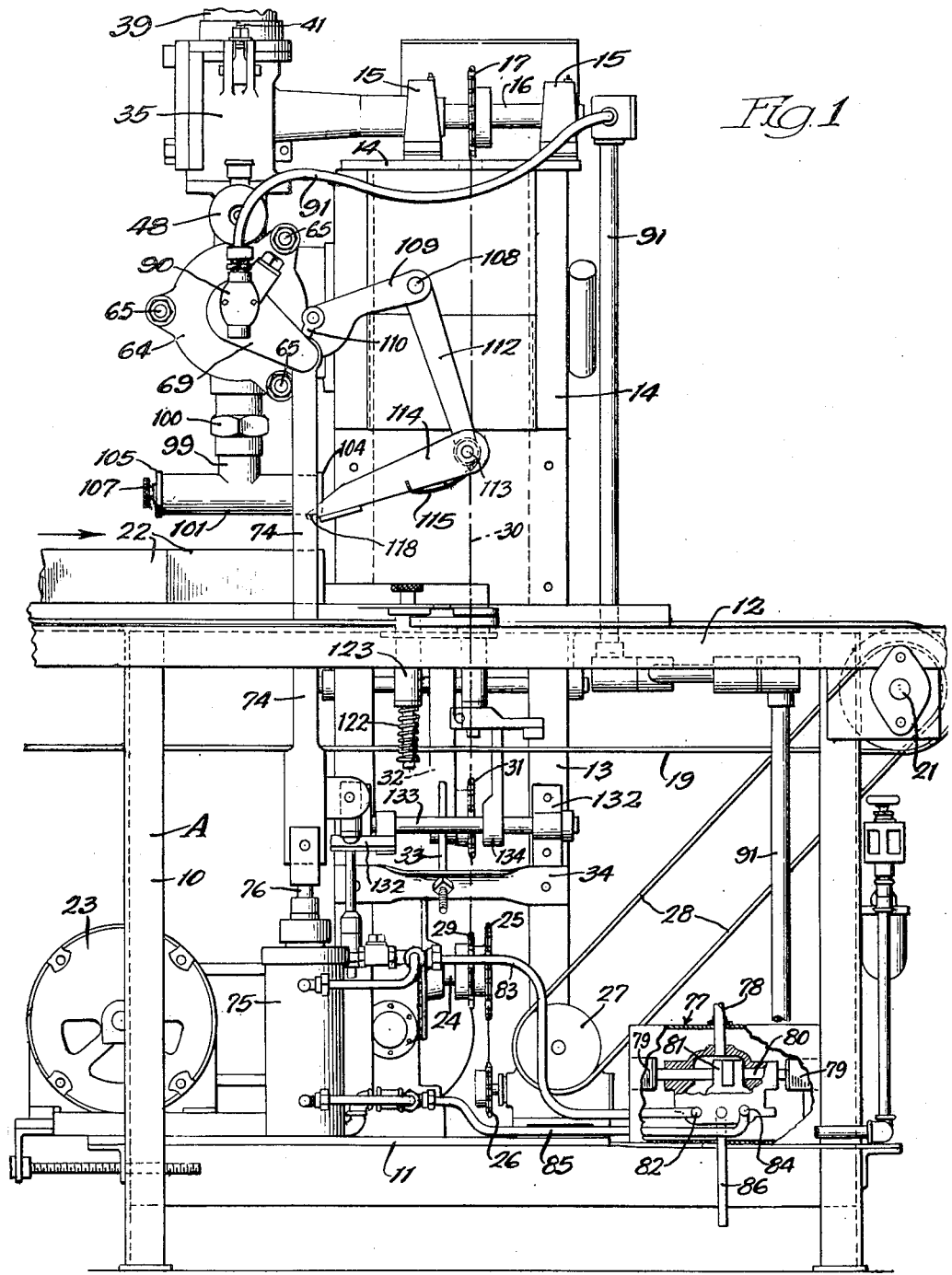

Dec. 9, 1952

B. S. HARRINGTON 2,620,960

FILLING MACHINE

Filed June 25, 1948

10 Sheets-Sheet 1

Inventor:
Bertie S. Harrington,
By Carl C. Batz atty

Dec. 9, 1952      B. S. HARRINGTON      2,620,960
FILLING MACHINE

Filed June 25, 1948      10 Sheets-Sheet 3

Inventor:
Bertie S. Harrington,
By: Carl C. Batz atty

Dec. 9, 1952     B. S. HARRINGTON     2,620,960
FILLING MACHINE
Filed June 25, 1948     10 Sheets-Sheet 4
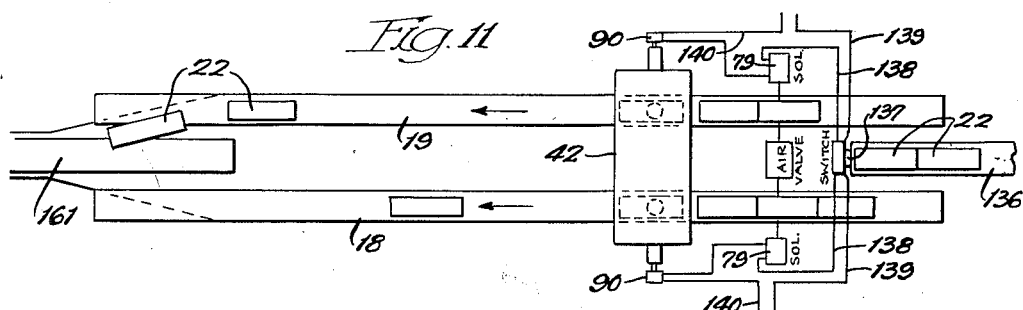
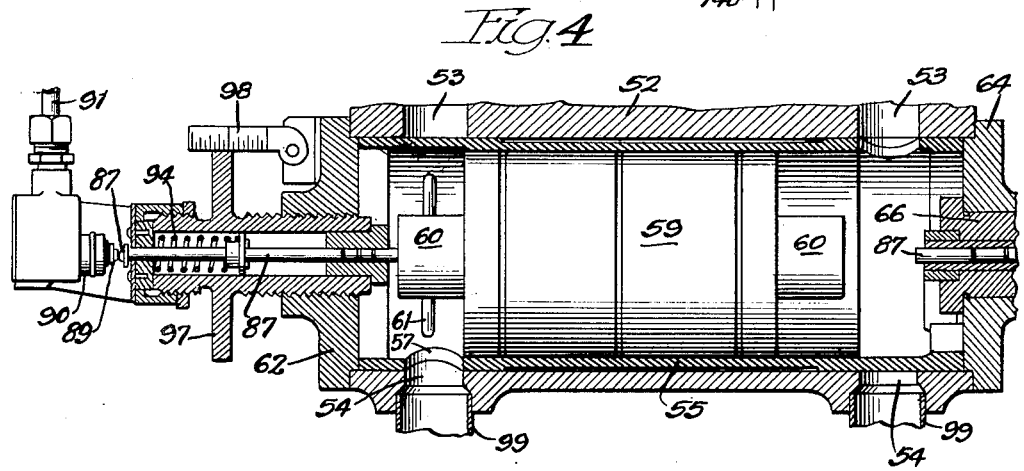
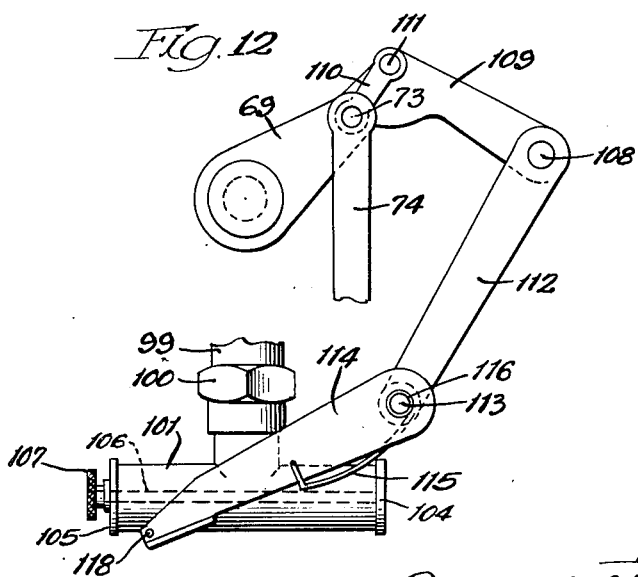
Inventor:
Bertie S. Harrington,
By: Carl C. Batz Atty Dec. 9, 1952 B. S. HARRINGTON 2,620,960
FILLING MACHINE
Filed June 25, 1948 10 Sheets-Sheet 5
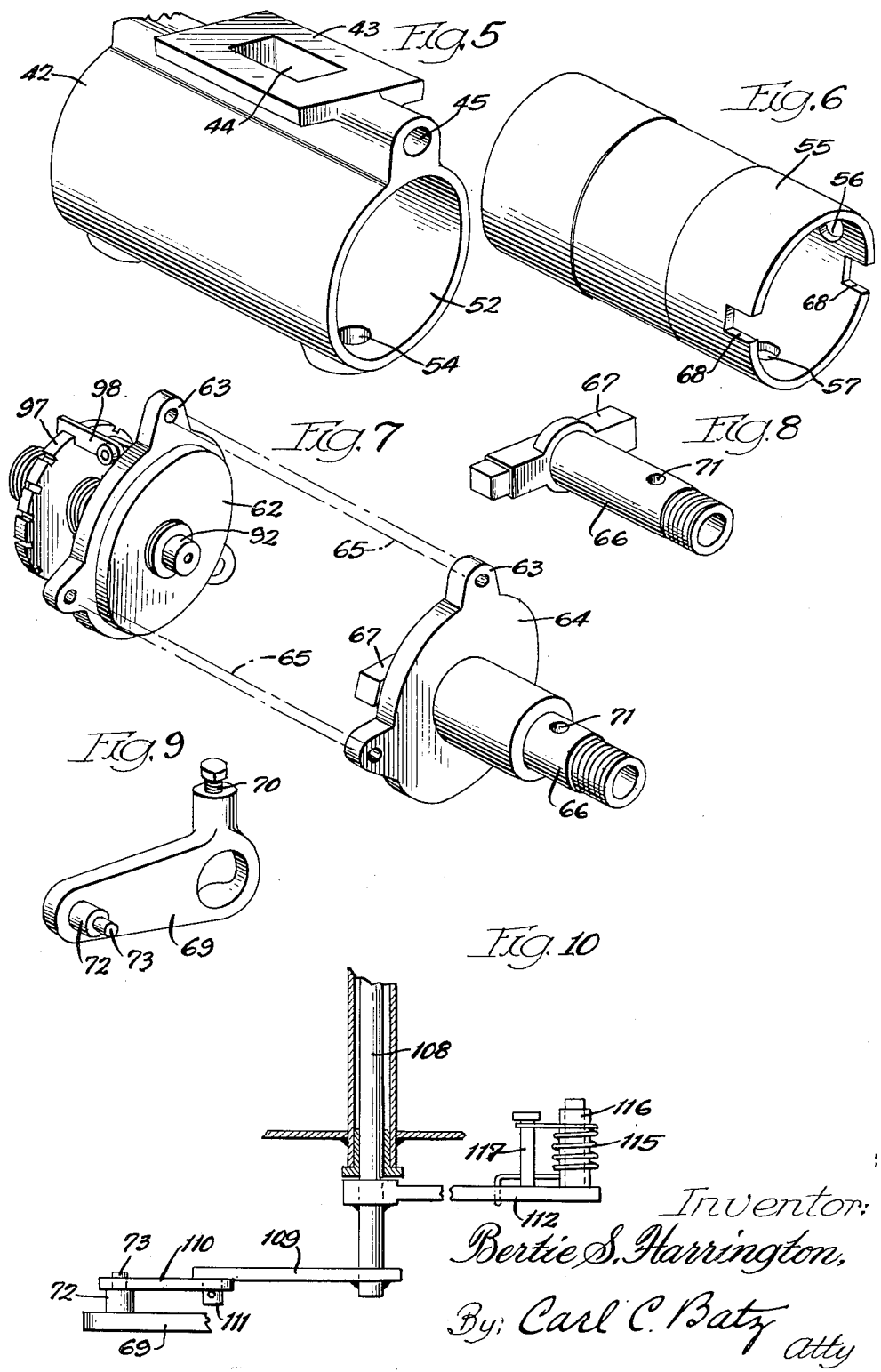
Inventor:
Bertie S. Harrington,
By: Carl C. Batz atty Dec. 9, 1952 B. S. HARRINGTON 2,620,960
FILLING MACHINE
Filed June 25, 1948 10 Sheets-Sheet 6
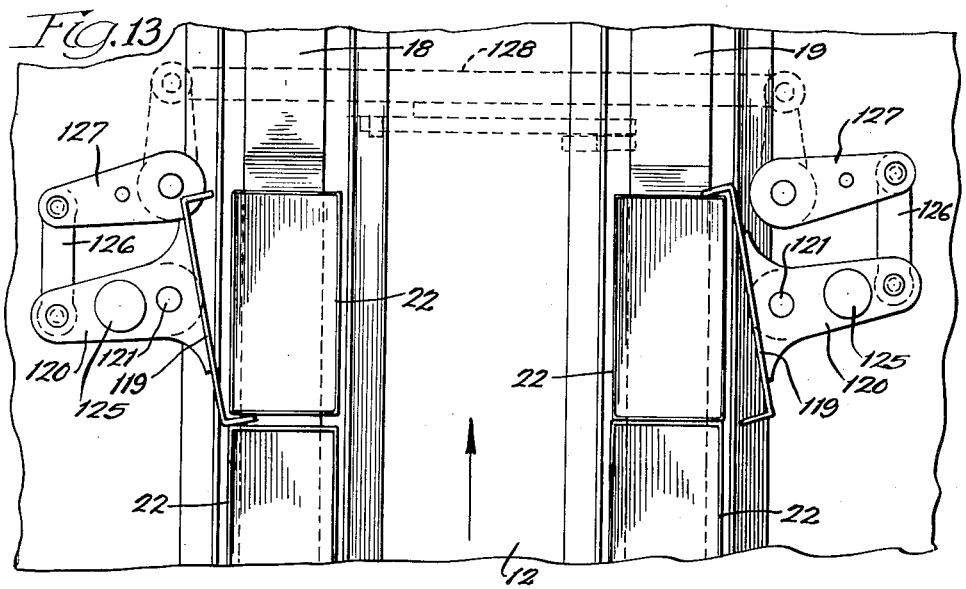
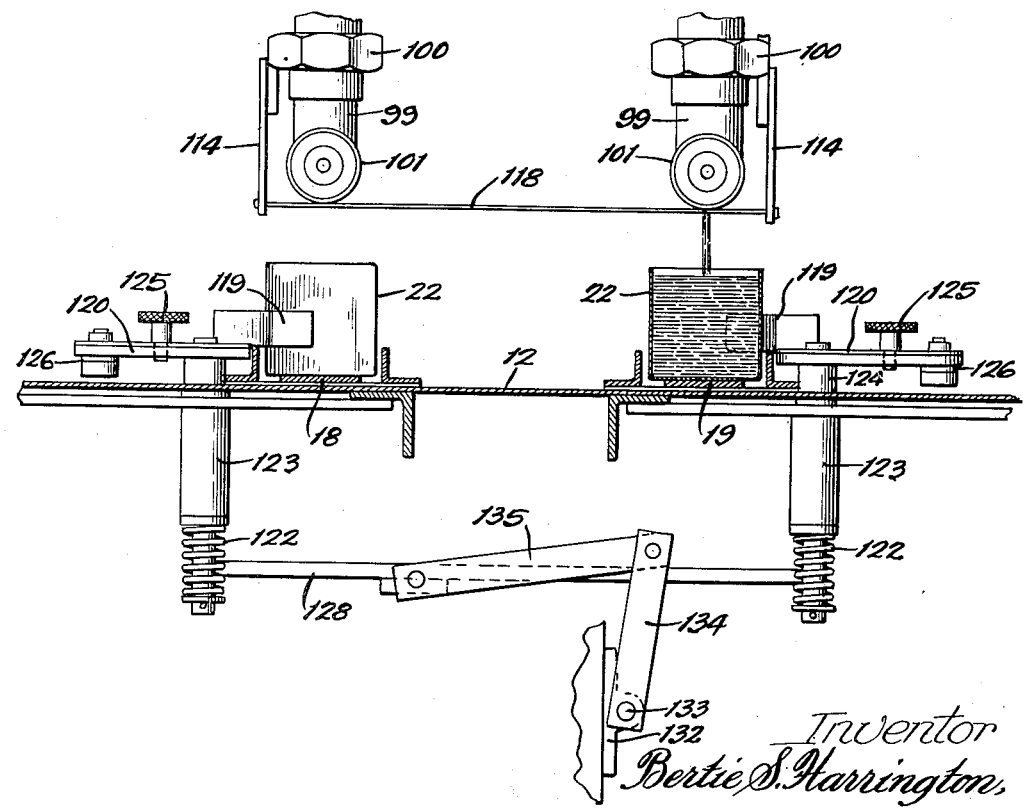
Inventor
Bertie S. Harrington,
By Carl C. Batz atty

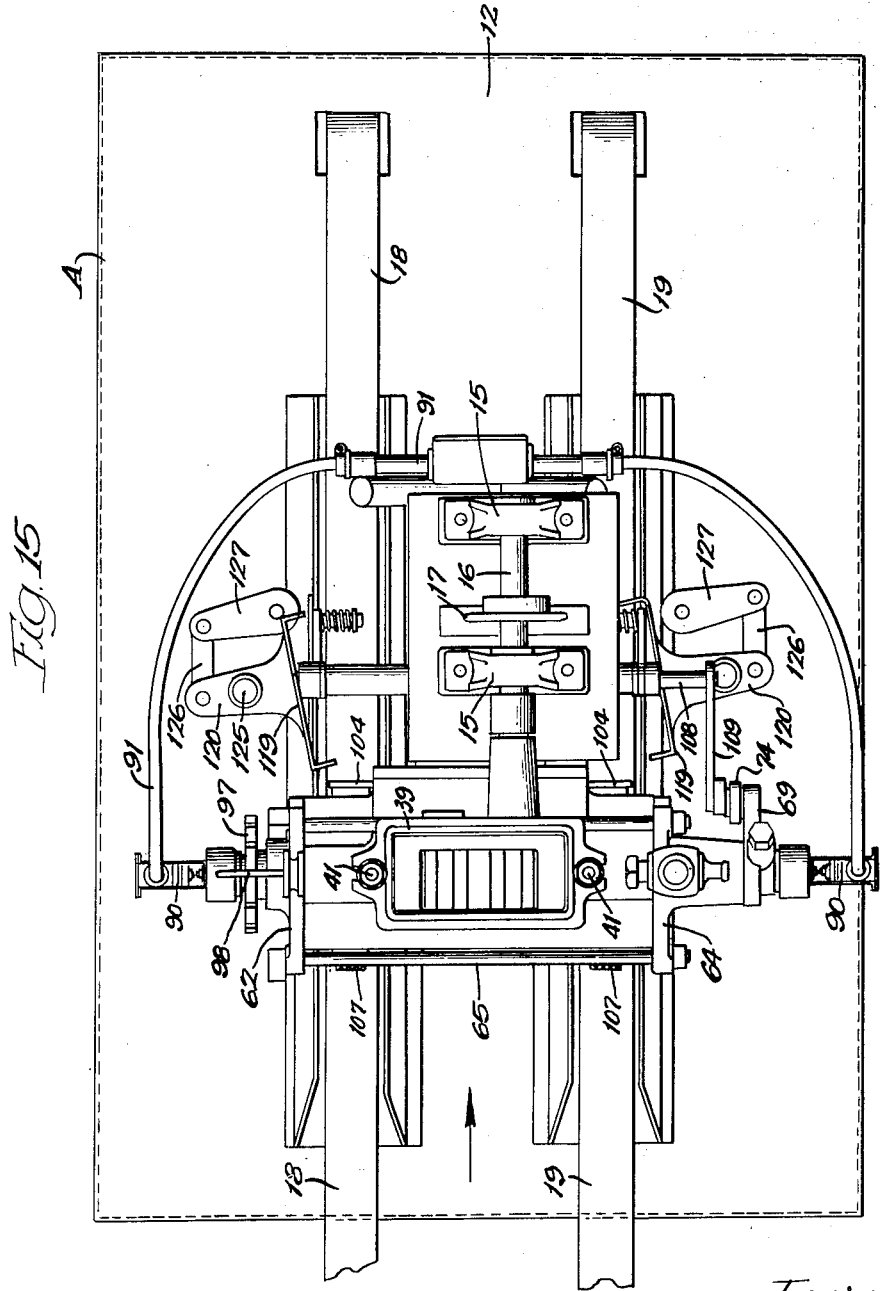

Dec. 9, 1952 B. S. HARRINGTON 2,620,960
FILLING MACHINE
Filed June 25, 1948 10 Sheets-Sheet 8
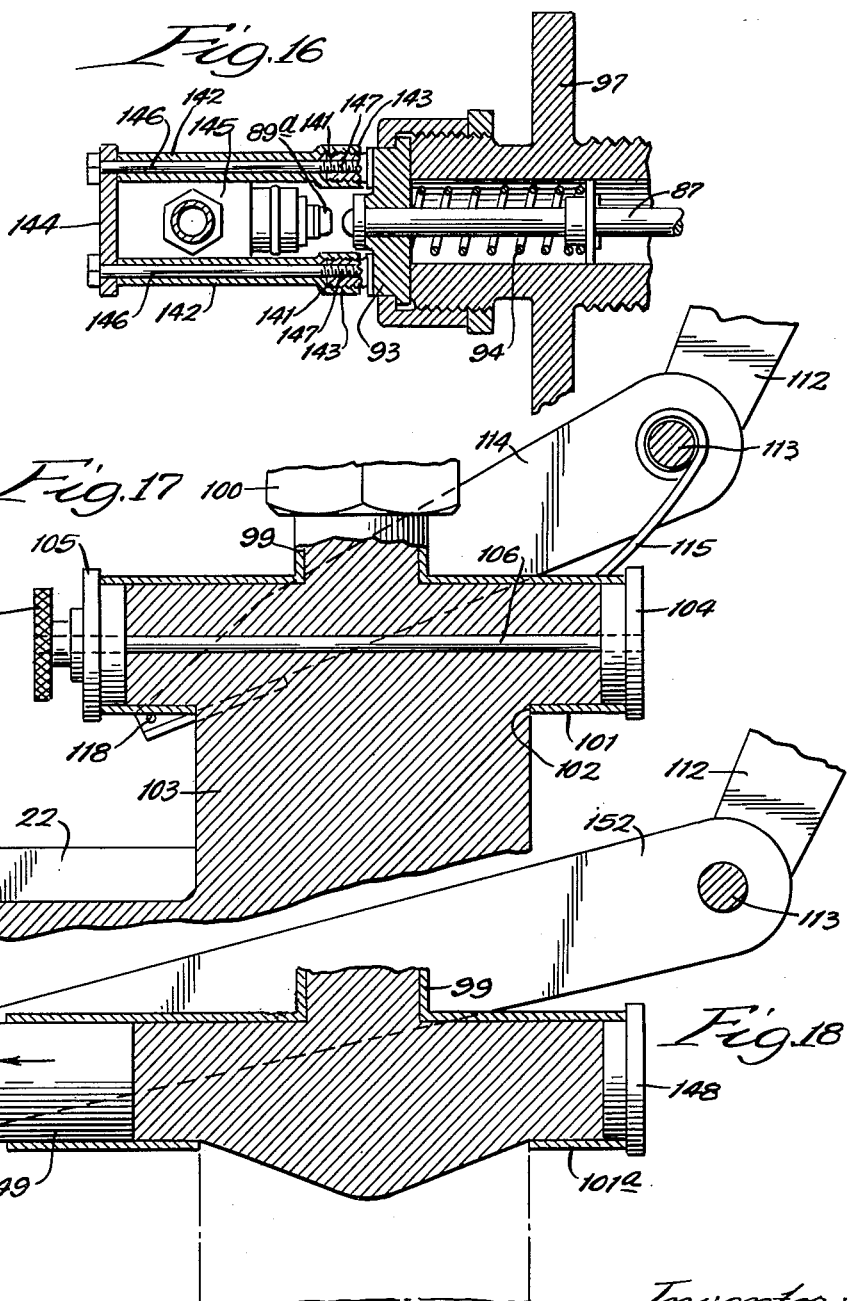
Inventor:
Bertie S. Harrington,
By Carl C. Batz
Attorney.

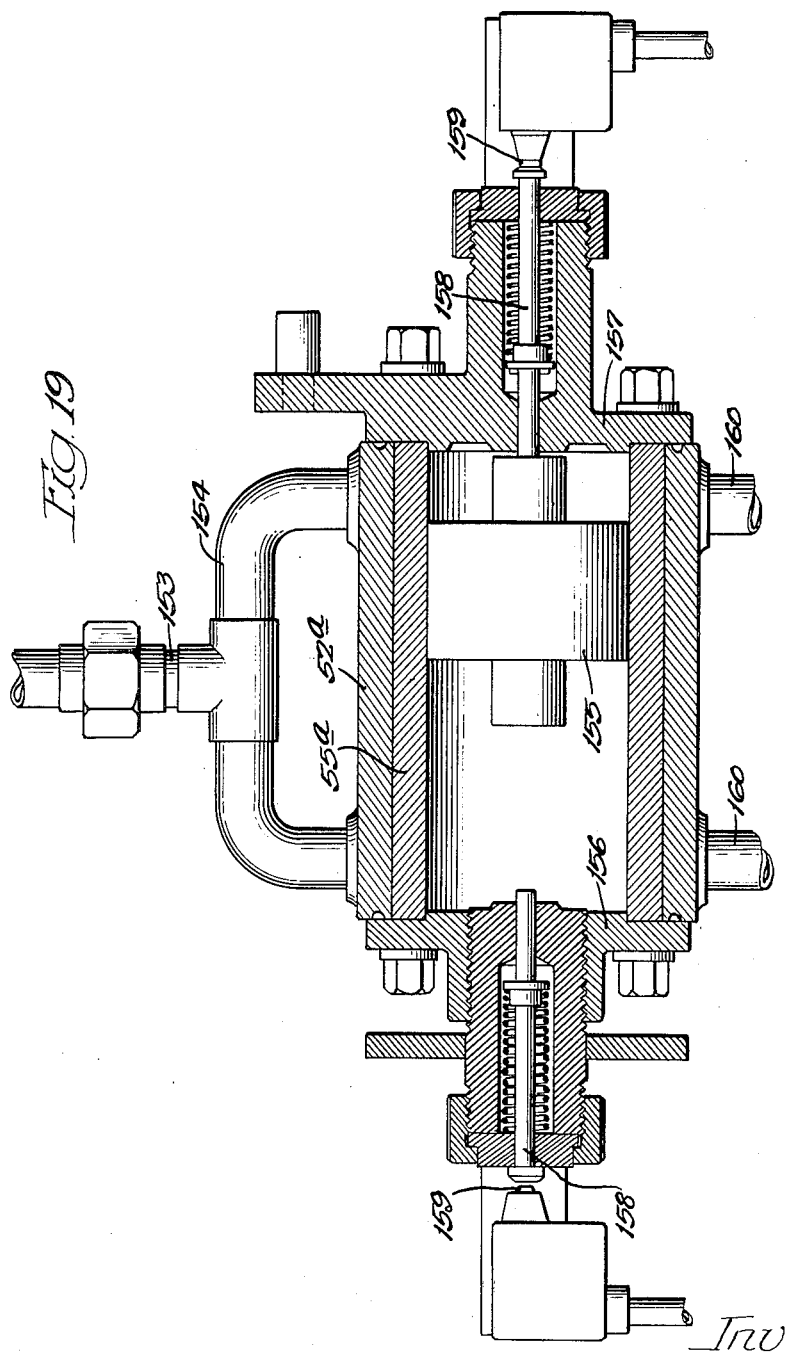

Dec. 9, 1952  B. S. HARRINGTON  2,620,960
FILLING MACHINE
Filed June 25, 1948  10 Sheets-Sheet 10
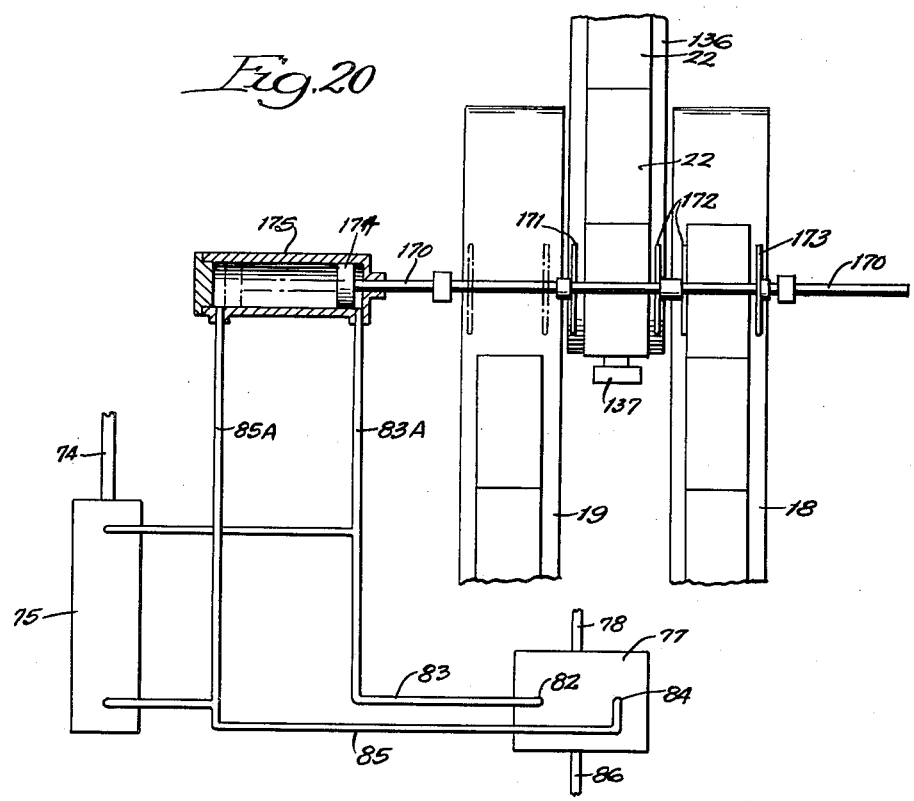
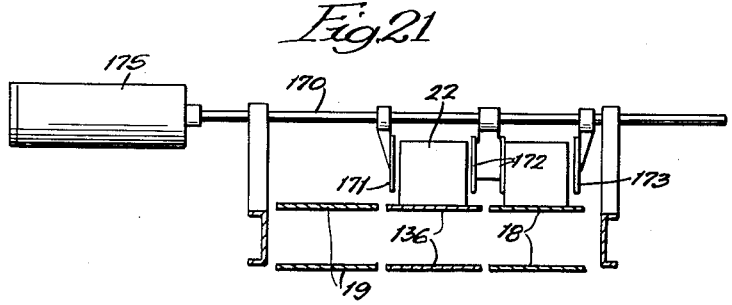
INVENTOR:
Bertie S. Harrington,
BY
Carl C. Batz
ATTORNEY.

Patented Dec. 9, 1952

2,620,960

UNITED STATES PATENT OFFICE 2,620,960

FILLING MACHINE

Bertie S. Harrington, Chicago, Ill., assignor to Armour and Company, Chicago, Ill., a corporation of Illinois Application June 25, 1948, Serial No. 35,193

7 Claims. (Cl. 226—99)

This invention relates to a filling machine and is particularly useful in measuring accurately quantities of material and discharging the same into separate containers. While applicable to other uses, the machine is especially useful in the measuring and dispensing of semi-solid materials, such as cheese, mayonnaise, lard, salad dressings, spreads, and a variety of other like products.

An object of the invention is to provide a machine in which a product is measured with extreme accuracy and discharged quickly into the appropriate containers, the material being passed into the measuring chamber under pressure. Yet another object is to provide a machine in which material is passed into a measuring chamber under pressure and travels from the measuring chamber directly to the dispensing aperture without retracing its course of travel. Yet another object is to provide a filling machine in which control means are provided for actuating reversing valves before the filling piston reaches the limit of its stroke. Another object is to provide in such a machine means for cutting off an excess portion of the semi-solid material clinging to the discharge tube or conduit after each filling operation. Another object is to provide means for drawing any excess portion of such material back into the conduit after the filling operation to prevent drippage, etc., and to insure an accurate discharge of the measured material. Still another object is to provide a machine of unique construction in which accurate valve means are provided for controlling the flow of material from a manifold through the measuring chamber and to the dispensing apertures. A further object is to provide highly effective mechanism for controlling the valve operation in the feeding of the measured material while at the same time controlling, in timed relation, the movement of the containers being filled and the release of the containers for advancement along a conveyor. A further object is to provide control mechanism which prevents the operation of the filling mechanism when a container is not present at a predetermined point on the conveyor mechanism. In general, the object of the invention is to provide an integrated machine in which the mechanism operates in timed relation for feeding semi-solid material, etc. under pressure into a measuring cylinder equipped with a floating piston, together with valve means for controlling the inflow and outflow of material from the cylinder, the valve means being set into operation before the piston reaches the limit of its stroke, means being also provided for the control of excess material about the discharge aperture, and effective control means being provided for the containers during the filling operation and release thereafter. A more specific object is to provide such a machine with structures which may be readily disassembled for cleaning in a minimum of operations while exposing the interior of the structures for thorough cleaning. Other specific objects and advantages will appear as the specification proceeds.

The invention is illustrated, in preferred embodiments, by the accompanying drawings, in which—

Figure 2:
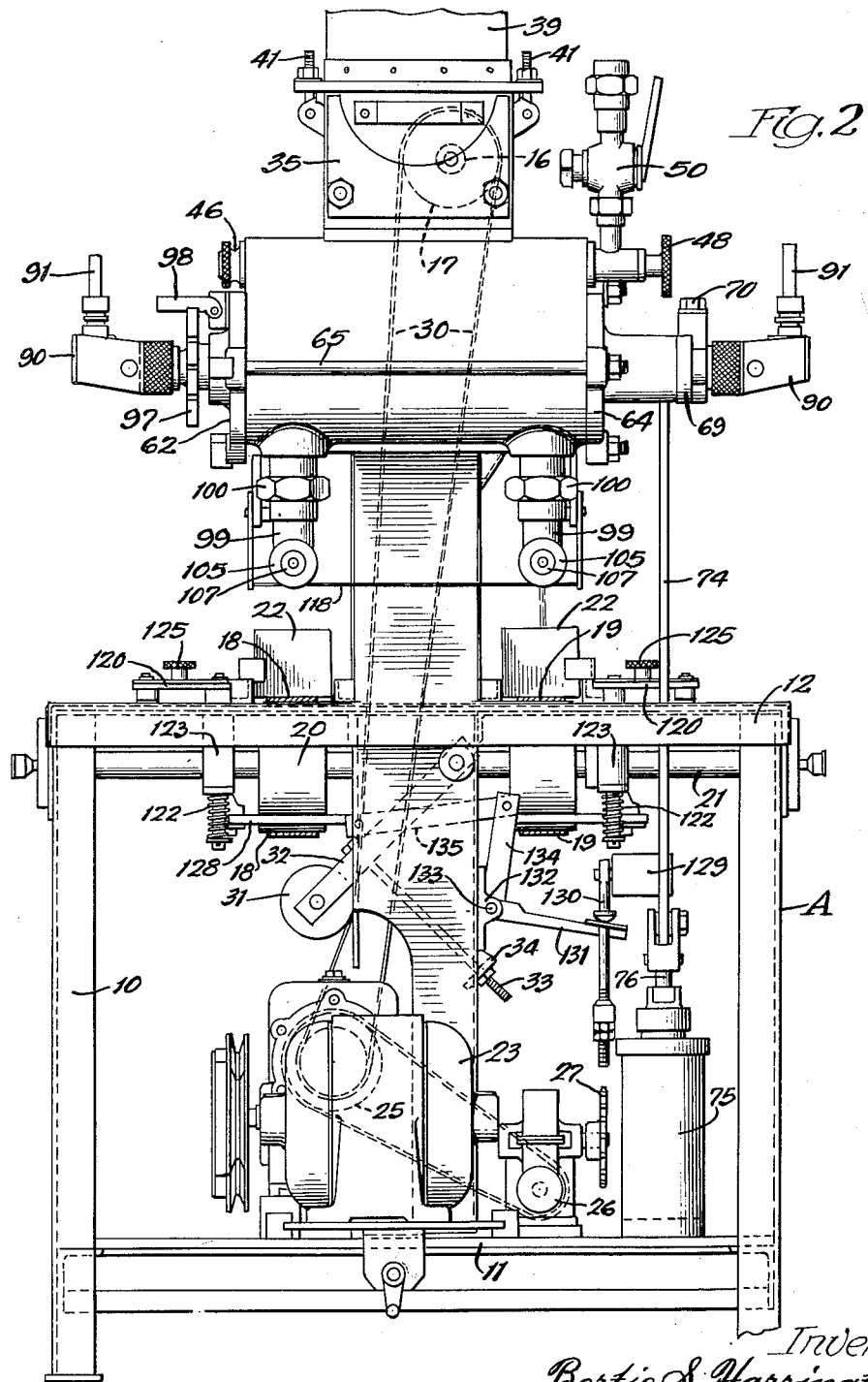
Figure 3:
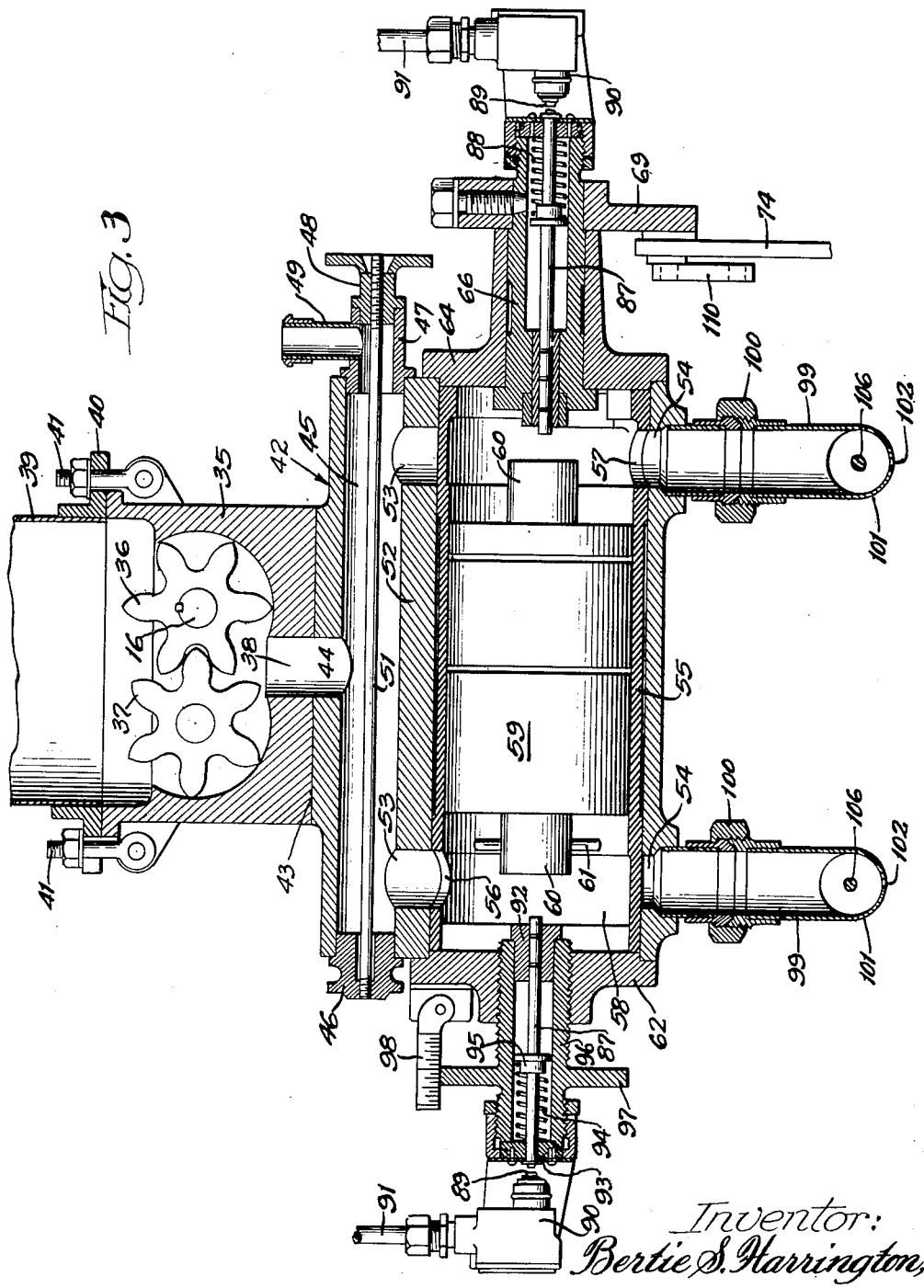

Fig. 1 is a broken side view in elevation of apparatus embodying my invention; Fig. 2, a broken end view in elevation; Fig. 3 an enlarged broken detail sectional view of the pump, manifold and filling structures; Fig. 4, a view similar to Fig. 3 on a smaller scale but showing the piston at one limit of its stroke; Fig. 5, a perspective view of the measuring cylinder; Fig. 6, a perspective view of the valve sleeve; Fig. 7, a perspective view of the end plate structures; Fig. 8, a perspective view of the actuating shaft and cross-arm for the valve sleeve; Fig. 9, a perspective view of the crank arm adapted to be attached to the actuating shaft; Fig. 10, a broken horizontal sectional view of apparatus for cutting off excess material from the discharge aperture; Fig. 11, a plan schematic view of the conveyor mechanism and the wiring circuit which may be employed; Fig. 12, a broken side view in elevation of the mechanism for cutting off the semi-solid material which may tend to cling about the discharge aperture; Fig. 13, a broken top plan view on an enlarged scale of the conveyor and the mechanism employed for controlling the discharge of containers; Fig. 14, a broken vertical sectional view illustrating the container controlling mechanism shown in Fig. 13; Fig. 15, a top plan view of the machine; Fig. 16, an enlarged plan sectional view of a modified form of adjustable contact and actuating means therefor; Fig. 17, a broken vertical sectional view illustrating the action of the cutting wire below the dispensing tube; Fig. 18, a view similar to Fig. 17 but showing a modified form of structure for controlling excess material about the dispensing aperture; Fig. 19, a vertical sectional view of a modified form of measuring cylinder and piston; Fig. 20, a plan schematic view similar to that of Fig. 11 but showing mechanism for transferring containers alternately to the two feed conveyors; and Fig. 21, a sectional view of the structure shown in Fig. 20.

In the illustration given, A designates a frame which may be of any suitable type or construction. In the illustration given, the frame A comprises standards 10 to which are secured a lower platform 11 and an upper platform 12. The frame A also includes vertical strap members 13 extending between the lower platform 11 and the upper platform 12. The frame A also has a portion 14 extending above the platform 12 and providing an upper plate 14 on which are mounted the shaft-supporting standards 15. A pump shaft 16 is mounted upon the standards 15 and is equipped with a sprocket wheel 17.

Upon the frame A are mounted two conveyor belts 18 and 19. The belts are carried by wheels 20 mounted upon a shaft 21 in the frame A, as shown more clearly in Fig. 2. It will be understood that similar wheels are provided at other points on the frame A for supporting the continuous conveyor belts 18 and 19. The conveyor belts 18 and 19 are arranged to carry containers 22 through the machine for the filling operation.

Any suitable means for driving the conveyor belts 18 and 19 may be provided. In the specific illustration given, a motor 23 is supported upon the platform 11 and drives through reduction gearing a shaft 24 equipped with a sprocket wheel 25. The sprocket wheel 25 is connected by a chain to the small sprocket 26 which, through its shaft and through reduction gearing, drives a second sprocket 27. The sprocket 27 is connected by the chain 28 to a sprocket mounted upon shaft 21, as shown more clearly in Fig. 1.

The motor-driven shaft 24 is equipped with a second sprocket 29 which drives through a chain 30 the sprocket 17 on pump shaft 16. The machine is shown equipped with a take-up sprocket 31 engaging the chain 30, the sprocket 31 being carried by the arm 32 pivotally supported upon the frame and an adjustment rod 33 carried by the arm 32 extends through the cross-straps 34.

The pump shaft 16 extends into a pump chamber casing 35 and carries a gear 36. The gear 36 intermeshes with an idler gear 37 to provide therewith a gear pump. The pump chamber is provided with a discharge port 38. Communicating with the upper end of the pump casing 35 is a casing 39 providing a hopper or column for receiving the material which is to be dispensed. The column 39 is equipped with a flange 40 releasably connected to the pump casing 35 below by the pivoted bolts 41.

Below the pump casing 35 is a casing member 42 having, as shown best in Fig. 3, a top flange 43 adapted to lie against the pump casing 35 and having an opening 44 communicating with the pump discharge 38. The casing 42 also provides a manifold 45 having open ends adapted to be sealed by closures. In the illustration given in Fig. 3, one end of the manifold is closed by an end plate 46 and the other end by a fitting 47 and a handle-equipped end plate 48. The fitting 47 is provided with an upwardly extending pipe 49 adapted to be connected to a valve-controlled conduit 50, as shown more clearly in Fig. 2. The conduit 50 is preferably extended upwardly so as to discharge into an upper portion of the conduit or column 39, when the valve is open. The two closure plates 46 and 48 are connected by a threaded rod 51 which permits both of the plates to be readily removed for the cleaning operation.

The casing 42 also provides a measuring cylinder 52, as shown more clearly in Figs. 3 and 5. The cylinder 52 is provided near its ends with the inlet ports 53 communicating with opposite ends of the manifold 45. The cylinder 52 is also provided near its ends at its bottom with the outlet ports 54.

Within the measuring cylinder 52 is mounted a valve sleeve 55. The valve sleeve is provided with ports 56 and 57 adjacent each end so that upon a rocking motion of the valve the inlet port 56 will be aligned with the inlet port 53 of the cylinder 52 while at the same time the outlet port 57 will be aligned with the outlet port 54 of the cylinder 52, as shown more clearly in Fig. 3. When the sleeve 55 is rocked back in the opposite direction, the inlet opening at the opposite end of the sleeve 55 is brought into communication with the other inlet opening 53 of the casing 52 while simultaneously the outlet opening at the opposite end of the sleeve 55 is brought into alignment with the outlet port there of the cylinder 52. Thus the valve sleeve 55 serves as a reversing valve for alternately opening the ports at opposite ends of the cylinder 52. Within the measuring chamber 58 within sleeve 55 is slidably supported a piston 59 having reduced extensions 60 at either end. One of the extensions 60 is preferably provided with a pin 61 extending there-through to facilitate the withdrawal of the piston for cleaning, etc.

The cylinder 52 is closed at one end by a closure plate 62 provided with outwardly extending apertured ears 63, as shown more clearly in Figs. 3 and 7. The opposite end of the cylinder 52 is closed by a closure plate 64 having also outwardly extending apertured ears 63. Threaded rods 65 extend through the apertured ears 63 and are provided with nuts for locking the end plates 62 and 64 in position.

Any suitable means may be provided for operating the reversing valve or sleeve 55. In the specific illustration given, I provide an actuating shaft 66 which is rotatably mounted within the sleeve or hub provided by the closure plate 64 and the shaft 66 is provided at its inner end with a cross-bar 67 having its ends received within slots 68 of the sleeve 55, as shown more clearly in Figs. 3, 6 and 8. If desired, the cross-bar 67 may be integrally formed with the sleeve 55 or, if desired, the sleeve 55 may be equipped with a fixed end plate to which the actuating shaft 66 is also fixed. In the specific illustration given, the rotation of shaft 66 produces, by means of the engagement of the crosspiece 67 with the notched sleeve 55, a rotation of the sleeve. Fixed to the actuating shaft 66 is a crank arm 69 having a set screw 70 engaging a recess 71 in the shaft 66. The crank arm 69 is provided at its end with a pin 72 and extending therefrom a smaller pin 73, as shown more clearly in Fig. 9. An actuating rod 74 is apertured to receive the pin 72 and means are provided for reciprocating the rod 74 to effect movement of the crank 69.

Any suitable means for actuating the rod 74 may be employed. In the specific illustration given, I provide a pressure fluid cylinder 75, which is supported upon platform 11 of base A, as shown more clearly in Figs. 1 and 2. The member 74 is pivotally connected at its bottom to a plunger 76 connected to a reciprocating piston within the cylinder 75. Since such cylinders are old, a detailed description is believed to be unnecessary. Pressure fluid such as, for example, compressed air, enters a solenoid controlled valve 77 through a pipe 78. The pipe may lead from a compressor driven by the motor or from any suitable source of compressed air within the plant. The valve 77 is provided with solenoids 79 receiving opposite ends of a shaft 80. A valve 81 is carried by the shaft 80 for controlling the ports shown. The port 82 communicates through pipe 83 with the top of the cylinder. The port 84 communicates through pipe 85 with the bottom portion of the cylinder. A vent pipe 86 communicates with the atmosphere below the machine. The pipes 83 and 85 are provided with branched conduits communicating with the cylinder and containing quick-acting valves. This structure is well known and is not described in detail, the purpose of such structure being to cushion the action of the piston near the limit of its stroke while then permitting quick action after the cushioning is effected.

Since the material is forced by the gear pump under pressure into the manifold and from thence into the measuring chamber, I wish to provide mechanism for preventing the building up of excess pressures while at the same time reducing to a minimum any pause between the working strokes of the piston. To effect this, I provide a spring-urged rod 87 in each end plate 64 and 62, the rod being adapted to engage the extension 69 of the piston before it reaches the end of its stroke and to make a contact actuating the solenoids 79 of the valve 77. In the actuating shaft 66, the rod 87 is supported for sliding movement and is urged by a spring 88 toward the plunger extension 69. The outer end of the rod 87 is adapted to engage a plunger 89 which closes a contact within the box 90 to actuate one of the solenoids 79. The cable connecting the solenoids 79 and the contact passes through the tubes 91, as illustrated. The rod 87 at the other end of the cylinder is supported at one end within the plug 92 and at the other end within the closure member 93. A spring 94 engages a collar 95 fixed to the rod 87 and urges it inwardly toward the piston extension 69. The outer end of this rod also is arranged to engage a plunger 89 for closing a contact within the box 90 and the electric cord extends through a tube 91 to the other solenoid 79. Thus each of the rods 87 is moved longitudinally before the piston 59 reaches the end of its stroke and an advance action of the valve 77 brings about a movement of the piston within cylinder 75 and an initial stroke of the actuating rod 74.

In the specific illustration given in Fig. 3, the members 92 and 93 are supported within a threaded member 96 equipped with a wheel handle 97 and having notches receiving the pivoted indicator arm 98. For adjustment of the contacts to change the timing, the rod 87 may be adjusted or the plunger 89 may be adjusted. I prefer to employ the adjustment shown in Fig. 16 which will be later described. It will be understood, however, that any suitable means for adjusting the plungers or contact members may be employed for changing the timing of the reversing valve sleeve.

Any suitable means for directing the material discharged from the measuring or dispensing chamber 58 may be employed. In the specific illustration given and as shown best in Figs. 3, 14 and 17, I provide a conduit 99 leading from each of the outlet ports 54 of the cylinder 52. The conduit 99 is preferably segmental and is connected by a coupling ring 100 for ready cleaning. The conduit 99 at its lower end communicates with a horizontally extending dispensing tube 101. The tube is provided at its bottom with an elongated slot or aperture 102 through which the material such as cheese, etc. may be discharged. In the illustration given in Fig. 17, the discharging semi-solid is indicated by the numeral 103. The ends of the tube 101 are closed by the end plates 104 and 105. A rod 106 fixed to the plate 105 and equipped with a handle 107 has its opposite end threadedly connected to the plate 104. Thus, upon rotation of the knurled handle or disc 107, the rod 106 may be disengaged from the plate 104 and the parts may be withdrawn for cleaning.

In the handling of semi-solid material, there is a tendency for a portion of the material to cling to the dispensing device and to provide a ragged or irregular body about the dispensing aperture. To provide for this and to insure the accurate filling of each container, I provide means for cutting the suspended material away from each of the dispensing tubes 101. In the illustration given, a cross-shaft 108 is supported in the frame A and is equipped at each end with a crank arm 109. A connecting link 110 pivotally engages the small pin 73 of the crank arm 69 which is connected to the actuating rod 74, and at its other end engages a pivot pin 111 fixed to the crank arm 109, as shown more clearly in Fig. 10. Thus with each reciprocation of the vertical actuating rod or bar 74, the shaft 108 will be rocked.

Fixed to each end of the rocked shaft 108 is a depending arm 112, as shown more clearly in Figs. 10 and 12, and freely supported upon a pin 113 at the bottom of arm 112 is a wiper arm 114. A spring 115 extends about a sleeve 116 about the shaft 113, and is connected at one end to a pin 117. The other end extends transversely through an opening in the wiper shaft 114. The forward ends of the members 114 are provided with a cutting wire 118 which is held by the arms 114 tightly below the apertures of the tubes 101, as shown more clearly in Fig. 14. At each stroke of the actuating rod 74, the wire is caused to move in one direction and to cut off the material suspended about the aperture of one of the tubes 101 from which material has just been discharged.

Any suitable means for controlling the movement of the containers 22 so as to insure their being in position for the filling operation and to insure their ready removal from such position after filling, may be provided.

In the illustration given, I provide on the outer side of each belt conveyor and just in front of the filling position, a U-shaped metal strap 119 supported upon a crank arm 120 pivotally mounted upon the pin 121. A spring 122 may be employed about the pin 121 and a cooperating sleeve 123 to urge the pin downwardly and a sleeve 124 is provided above the platform 12 to support the link 120, as shown more clearly in Figs. 13 and 14. If desired, the arm 120 may be provided with a manual handle 125. The outer end of the crank arm 120 is connected to a link 126 which in turn is connected to one arm of a bell crank 127. The other arm of the bell crank is connected to a cross-rod 128.

Means for actuating the cross-rod 128 for movement of the members 119 will now be described. As shown more clearly in Figs. 2 and 14, the actuating bar 74 is equipped with a laterally extending bracket 129. A depending rod 130 is anchored to an arm 131 pivoted upon the bracket 132 of the frame. The arm 131 is fixed to a shaft 133 and to the shaft 133 is fixed an upwardly extending arm 134. A link 135 is pivotally connected to the upper end of arm 134 and at its other end is pivotally connected to the cross-shaft 128. Thus upon reciprocation of the actuating shaft 74, the lever 131 is rocked and the member 134 is moved in a lateral plane moving the cross-shaft 128 first toward one side of the machine and then toward the other. This brings about a rotation of the bell crank 127, link 126 and the rocking arm 120. Thus the members 129 alternately engage the containers 22 to hold them against movement or to release them for movement on the moving conveyor.

In Fig. 11 is given a schematic view of the wiring layout. The conveyor belts 18 and 19 are shown in spaced-apart relation. Between the conveyors 19 at one end is a single continuous belt conveyor 136. At the forward end of the conveyor 136 is a switch 137 having a contact adapted to be closed by engagement with a container 22. The switch 137 is, in effect, a master switch and the circuit controlling the filling operation is not operative unless switch 137 is closed.

While the containers 22 may be manually transferred to the conveyors 18 and 19, I prefer to employ automatic mechanism, similar to the escapement or retainer members 119 already described for controlling the movement of the containers 22, for transferring the containers alternately from the central belt 136 to the machine belts 18 and 19. It is sufficient for the present purpose, however, to indicate that the switch 137 is connected to the solenoid circuits. The switch 137 is connected by leads 138 to the solenoids 79 and by leads 139 to the source of current. Leads 140 lead back to the source of current from the contacts in boxes 90 and from thence to the solenoids 79.

Operation

In the operation of the apparatus, containers are advanced along belt 136 and from thence upon the machine belts 18 and 19. It will be understood that the master switch 137 is closed by contact with a container 22. The conveyors 18 and 19 carry the containers forwardly until they are engaged by the retainer members 119. These members act alternately to check the movement of a container and to release a container for forward movement upon the conveyor.

Material to be filled into the containers is introduced into the column 39 and is discharged downwardly through gear pump 38 into the manifold 45. The sleeve valve 55 rocks between positions in which it connects an inlet port at one end of the casing with the manifold and an outlet port at the opposite end of the cylinder with the interior of the measuring chamber. Under the pressure of the material, the piston 59 is moved laterally toward the end of the cylinder having its discharge port open and material is discharged through the conduit 19 and thence out through the dispensing tube 101 into a waiting container 22. As the piston moves laterally, it strikes an actuating rod 87 which in turn engages the plunger 89 to close the contact in box 90 thus closing the circuit of one of the solenoids. The solenoid reciprocates shaft 80 to open one of the ports and to permit compressed air to pass either to the top or the bottom of the cylinder, thus reciprocating the actuating bar 74. Bar 74 actuates crank 69 rotating actuating shaft 66. This in turn rotates the sleeve 55 to open the other inlet port of the cylinder and simultaneously to open the other discharge port at the opposite end of the cylinder. The piston thereupon moves in the opposite direction striking the other actuating rod 87 and closing the contact in the circuit of the other solenoid. The valve 81 is shifted then in the opposite direction to admit compressed air to the other end of cylinder 75 and to effect movement of the bar 74 in the opposite direction.

With each filling operation, the actuating bar 74 effects a reciprocation of the wiper shafts 114 so as to draw the cutter wire 118 under the discharge port of the tube 101 from which material has just been discharged. The wire 118 is thus moved alternately in opposite directions to effect the cutting off of any material hanging from either of the discharge tubes 101.

The retainer or escapement members 119 are tilted so as to hold the container against movement just ahead of the container which is being filled. In other words, the member 119 by holding one of the members, as illustrated in Fig. 13, maintains the containers there behind in fixed position and in the specific machine shown, the container behind the one held is in the filling position. After being filled, the member 119 is tilted rearwardly at its front to release the container, as shown on the lefthand side of Fig. 13.

The gear pump supplies the semi-solid material to the measuring chamber 58 under a relatively even pressure. This pressure may be varied as desired. In the filling of cheese containers, I prefer to employ a pressure of from 10 to 20 pounds and preferably about 12 pounds. It will be understood, however, that different pressures may be used for different materials being discharged into containers. The course of the material is a direct course leading from the pump into a manifold, then into one end of the measuring chamber and from the measuring chamber directly to the discharge tube 101.

In the modification shown in Fig. 16, the plate 93a is provided with outwardly extending threaded lugs 141. A pair of sleeves 142 are provided with interiorly threaded end portions 143 receiving the threaded lugs 141. A yoke 144 connects the sleeves 142 and supports the contact or switch box 145 in which is mounted the plunger 89a. Locking rods 146 extend through the yoke 144 and the sleeves 142, as illustrated in Fig. 16, and have threaded ends 147 engaging a tapped opening in the threaded studs 141. The actuating rod 87 and the remainder of the structure is as shown in Fig. 3.

In the operation of the structure shown in Fig. 16, if it is desired to adjust the distance between plungers 87 and 89a, the sleeves 142 are rotated to advance or retract the yoke 144 and the plunger 89a supported thereby. After the desired point of adjustment has been reached, the locking rods 146 are tightened so as to prevent movement of the adjustment sleeves 142.

In the modification shown in Fig. 18, the dispensing tube 101a is provided on one side with a closure 148 and on the other side is provided with a plunger 149. The plunger 149 is equipped with an extension 150 connected by pivot 151 to the actuating arm 152 pivotally connected to the lower end of the shaft 112. In this modification, the arm 112 instead of drawing a cutting wire under the aperture of the tube 101a, reciprocates through link 152 the plunger 149. After the discharge operation, when the semi-solid material is hanging from the tube 101a about the aperture, the plunger 149 is moved to the left and under this suction effect, the suspended material is drawn upwardly and back into the tube 101a.

In the modification illustrated in Fig. 19, a conduit 153, leading from a pump or any other suitable source of pressure, communicates with an inverted U-shaped pipe 154. The ends of the pipe 154 communicate with inlet apertures in the cylinder 52a. Within the cylinder 52a is mounted a valve sleeve 55a having at its ends discharge and inlet openings corresponding with the discharge and inlet openings of the cylinder 52a. A single piston 155 is mounted in the sleeve 55a. In this structure, the end plates 156 and 157 are fixed to the inner sleeve 55 and rotate therewith while the outer cylinder 52a is stationary. The end plates are each equipped with actuating rods 158 and these are adapted to make contact with contact closing plungers 159. The outlet tubes 160 lead from the outlet ports in the fixed cylinder 52a to filling tubes of the type already described.

It will be understood that the conveyor mechanism may be varied widely as desired. After the containers 22 have been filled, any suitable means may be employed for directing the containers back upon a single outlet conveyor 161, as indicated schematically in Fig. 11.

In the structure shown in Figs. 20 and 21 is automatic mechanism for transferring the containers alternately from the central belt 136 to the machine belts 18 and 19. A rod 170 extends above the belts 18 and 19 and the constantly-driven continuous feeder belt 136. The rod 170 is provided with fingers 171, 172 and 173 which extend downwardly from the rod and then laterally so as to be movable across the belts 18, 19 and 136 for moving the containers from belts 136 to the side belts 18 and 19. At the proper time, the rod 170 is moved to the left, carrying the foremost carton 22 which abuts the switch 137 to the left so as to deposit it on the conveyor 19. In the next operation, the rod 170 reciprocates to the right, carrying the next carton over to conveyor 18.

Any suitable means for reciprocating rod 170 may be employed. For example, referring to Figs. 20 and 21, rod 170 may be attached to a piston 174 within a cylinder 175. The piston may be reciprocated by applying air pressure first at one end of the cylinder 175 and then at the other, as indicated in Fig. 20. The alternate application of air pressure to the ends of cylinder 175 may be synchronized with the operation of the filling machine by utilizing the solenoid-controlled valve 7, as shown in Fig. 1. Thus air may be supplied to one side of cylinder 175 through a line 83, which is a branch of pipe 83, and air may be supplied to the other side of cylinder 175 through the line 85a, which is a branch of pipe 85, thereby synchronizing the movement of rod 170 with the movement of rod 74 which controls the rotation of the sleeve valve. While the cylinder 175 is shown located at one side of the belts, it will be understood that the cylinder may, if desired, be located under the belts or at any suitable point. In the operation of the machine, the conveyor belts are constantly running independently of the master switch 137 and of the operation of the filling mechanism. The continuous conveyor 136 brings the containers in a steady line forwardly so as to bring them successively into contact with the master switch 137. When the leading container which is in contact with the master switch 137 is moved laterally by the transfer rod 170 so as to transfer the container to conveyor 18 or 19, there is an instant during which the master switch 137 is not contacted by a carton or container. However, during this instant when the container is being moved from the conveyor 136 to conveyor 18 or 19, the measuring cylinder piston 59 is midway between the contact rods 87, as illustrated in Fig. 3, and, therefore, the instant during which no container contacts switch 137 is at a time when no electric circuit is being employed to operate the machine. It is not until the measuring cylinder piston 59 reaches one of the contact rods 87 that the electrical system is utilized at all, and by the time this contact is made, the next container is moved into contact with master switch 137. Thus, while the actuation of the electrical system is intermittent, the filling operation is substantially continuous.

While in the foregoing specification, I have set forth preferred embodiments of the invention in considerable detail for the purpose of illustrating the invention, it will be understood that such details may be varied widely by those skilled in the art without departing from the spirit of my invention.

I claim:

1. In a filling machine, a measuring cylinder provided at the ends with ports for the inflow and outflow of fluids, a filling nozzle for and communicating with each of the ports for the outflow of fluids, means for feeding containers to be filled below said filling nozzles, valve mechanism for alternately directing material to be measured into the ports of said cylinder for the inflow of fluids, a longitudinally-movable member in each end of said cylinder, a solenoid valve, contacts engageable with the outer end of said longitudinally-movable members for controlling said solenoid valve, a floating piston in said cylinder and engageable with said longitudinally-movable members, said longitudinally movable members being positioned for engagement with the said contacts before said piston reaches the end of its stroke, pivoted escapement members mounted for movement partially across said feeding means, and fluid-operated means controlled by said solenoid valve for operating said valve mechanism and said pivoted escapement members to maintain said containers under said nozzles in synchronism with the filling of the containers.

2. In a filling machine, a measuring cylinder provided with ports at the ends thereof for the inflow and outflow of fluids, filling nozzles communicating with the ports for the outflow of fluids and adapted to discharge material into containers, a pair of continuous conveyors adapted to carry containers below said filling nozzles, valve mechanism for alternately directing material into the ports for the inflow of fluids, a longitudinally-movable member in each end of said cylinder, a solenoid-operated valve, switches engageable with the ends of said longitudinally-movable members and in circuits with said solenoid for controlling the actuation of said solenoid valve, fluid pressure-operated means for actuating said valve mechanism, the flow of said fluid to said fluid-operated means being controlled by said solenoid valve, a floating piston in said cylinder arranged for engagement with one of said longitudinally-movable members prior to the end of the stroke of the piston, means associated with said conveyor and said fluid-operated means for maintaining containers below said nozzles in synchronism with the discharge of material from said nozzles, a normally open switch in the electric circuit controlling said solenoid and arranged for contact with a container being fed to the machine, whereby said machine is brought into operation only when a container closes said switch and feeder conveyor means operating independently of said open switch for feeding containers to said machine and into contact with said switch.

3. In a filling machine, a measuring cylinder provided at the ends with ports for the inflow and outflow of fluids, filling nozzles communicating with the ports for the outflow of fluids, means for feeding containers to be filled below said filling nozzles, valve mechanism for alternately directing material to be measured into the ports of said cylinder for the inflow of fluids, a longitudinally-movable member in each end of said cylinder, a floating piston in said cylinder and engageable with said longitudinally-movable members, an electrically-operated valve, contacts engageable with the outer ends of said longitudinally-movable members for controlling said electrically-operated valve, said longitudinally-movable members being positioned for engagement with said contacts before said piston reaches the end of its stroke, escapement members mounted for movement partially across said feeding means, and fluid-operated means controlled by said electrically-operated valve for operating said valve mechanism and said escapement members to maintain said containers under said nozzles in synchronism with the filling of the containers.

4. In a filling machine, a measuring cylinder provided with ports at the ends thereof for the inflow and outflow of fluids, filling nozzles communicating with the ports for the outflow of fluids and adapted to discharge material into containers, conveyor means adapted to carry containers below said filling nozzles, valve mechanism for alternately directing material into the ports for the inflow of fluids, a longitudinally-movable member in each end of said cylinder, an electrically-operated valve, circuit makers engageable with the ends of said longitudinally-movable members and in circuits with said electrically-operated valve for controlling the actuation of the electrically-operated valve, fluid pressure means for actuating said valve mechanism, the flow of said fluid to said fluid-operated means being controlled by said electrically-operated valve, a floating piston in said cylinder arranged for engagement with one of said longitudinally-movable members, means associated with said conveyor and said fluid-operated means for maintaining containers below said nozzles in synchronism with the discharge of material from said nozzles, a normally open switch in the electric circuit controlling said electrically-operated valve and arranged for contact with the container being fed to the machine, whereby said machine is brought into operation only when a container closes said switch and means independent of said switch for feeding containers seriatim into contact with said open switch.

5. In a filling machine, a measuring cylinder provided with ports at the ends thereof for the inflow and outflow of fluids, filling nozzles communicating with the ports for the outflow of fluids and adapted to discharge material into containers, means for feeding containers to be filled below said filling nozzles, valve mechanism for alternately directing material into the ports for the inflow of fluids, a longitudinally-movable member in each end of said cylinder, electrically-operated means for controlling the actuation of said valve mechanism, an electric circuit for said electrically-operated means, circuit makers in said circuit arranged for actuation by said longitudinally-movable members, means associated with said feeding means and said electrically-operated means for maintaining containers below said nozzles in synchronism with the discharge of material from said nozzles, a circuit maker in the electrical circuit controlling said electrically-operated means and arranged for contact with the container being fed to the machine, whereby said machine is brought into operation only when a container engages said last-mentioned circuit-maker and means independent of said circuit-maker for feeding containers seriatim into contact with said circuit-maker.

6. In a filling machine, a measuring cylinder provided at the ends with ports for the inflow and outflow of fluids, filling nozzles communicating with the ports for the outflow of fluids, means for feeding containers to be filled below said filling nozzles, valve mechanism for alternately directing material to be measured into the ports of said cylinder for the inflow of fluids, a longitudinally-movable member in each end of said cylinder, a floating piston in said cylinder and engageable with said longitudinally-movable members, an electrically-operated valve, contacts engageable with the outer ends of said longitudinally-movable members for controlling said electrically-operated valve, escapement members mounted for movement across a portion of said feeding means, means controlled by said electrically-operated valve for operating said valve mechanism and said escapement members to maintain said containers under said nozzles in synchronism with the filling of the containers, means in the electric circuit rendered operative by the presence of a container at a selected point for controlling said electrically-operated valve, whereby said machine is brought into operation only when a container is present at said point and feeder means, independent of said last-mentioned means, for feeding containers to said selected point.

7. In a filling machine, a measuring cylinder provided at the ends with ports for the inflow and outflow of fluids, filling nozzles communicating with the ports for the outflow of fluids, means for feeding containers to be filled below said filling nozzles, valve mechanism for alternately directing material to be measured into the ports of said cylinder for the inflow of fluids, an electrically-operated valve, a circuit for said electrically-operated valve, a floating piston in said cylinder, means positioned for actuation by said floating piston before the piston reaches the end of its stroke for controlling said circuit to effect operation of said valve, escapement members mounted for movement across a portion of said feeding means, and means controlled by said electrically-operated valve for operating said valve mechanism and said escapement members to maintain said containers under said nozzles in synchronism with the filling of the containers.

BERTIE S. HARRINGTON.

(References on following page)

REFERENCES CITED

The following references are of record in the file of this patent:

UNITED STATES PATENTS

| Number | Name | Date |
|---|---|---|
| 685,561 | Bettermann | Oct. 29, 1901 |
| 719,413 | Anderson | Feb. 3, 1903 |
| 1,328,025 | Wheeler | Jan. 13, 1920 |
| 1,458,383 | Bassler | June 12, 1923 |
| 1,470,381 | Lamb | Oct. 9, 1923 |
| 1,470,684 | Cade | Oct. 16, 1923 |
| 1,482,467 | Harrington | Feb. 5, 1924 |
| 1,583,389 | Cleveland et al. | May 4, 1926 |
| 1,590,278 | Bell | June 29, 1926 |
| 1,700,494 | Harrington | Jan. 29, 1929 |
| 1,804,772 | Hubbard | May 12, 1931 |
| 1,861,734 | Bergmann | June 7, 1932 |
| 1,932,976 | Lamb et al. | Oct. 31, 1933 |
| 2,152,339 | Anderson | Mar. 28, 1939 |
| 2,215,011 | McCoy et al. | Sept. 17, 1940 |
| 2,234,432 | Gallo | Mar. 11, 1941 |
| 2,319,167 | Stewart | May 11, 1943 |
| 2,333,232 | Bleam et al. | Nov. 2, 1943 |
| 2,352,490 | Meyers | June 27, 1944 |
| 2,383,536 | Elliott | Aug. 28, 1945 |
| 2,491,826 | Meyers et al. | Dec. 20, 1949 |

FOREIGN PATENTS

| Number | Country | Date |
|---|---|---|
| 403,465 | Germany | Sept. 29, 1924 |
| 727,367 | France | Mar. 22, 1932 |
| 211,134 | Switzerland | Nov. 1, 1940 |
| 593,871 | Great Britain | Oct. 28, 1947 |